US010572847B2

(12) United States Patent
Ho et al.

(10) Patent No.: US 10,572,847 B2
(45) Date of Patent: Feb. 25, 2020

(54) DYNAMIC SPACE-TIME DIAGRAM FOR VISUALIZATION OF TRANSPORTATION SCHEDULE ADHERENCE

(71) Applicant: Conduent Business Services, LLC, Florham Park, NJ (US)

(72) Inventors: Ion Ho, Rochester, NY (US); John C. Handley, Fairport, NY (US)

(73) Assignee: Conduent Business Services, LLC, Florham Park, NJ (US)

( * ) Notice: Subject to any disclaimer, the term of this patent is extended or adjusted under 35 U.S.C. 154(b) by 1144 days.

(21) Appl. No.: 14/511,516

(22) Filed: Oct. 10, 2014

(65) Prior Publication Data

US 2016/0104081 A1 Apr. 14, 2016

(51) Int. Cl.
 *G06Q 10/06* (2012.01)
 *G06Q 50/30* (2012.01)
 (Continued)

(52) U.S. Cl.
 CPC ......... *G06Q 10/0633* (2013.01); *H04L 67/36* (2013.01); *H04W 4/029* (2018.02); *G06Q 50/30* (2013.01)

(58) Field of Classification Search
 CPC ....... G06Q 50/30; G06Q 10/047; G06Q 10/04
 (Continued)

(56) References Cited

U.S. PATENT DOCUMENTS 5,836,529 A * 11/1998 Gibbs ................. B61L 27/0022
 246/122 R
6,834,229 B2 12/2004 Rafiah et al.
 (Continued)

FOREIGN PATENT DOCUMENTS

EP 2051223 A1 4/2009
JP 2002154612 A 5/2002
 (Continued)

OTHER PUBLICATIONS

Feng, W., and Figliozzi, M., 2012. Developing a bus service reliability evaluation and visualization framework using archived AVL/APC data. Paper presented at the Western ITE Conference, Santa Barbara, California, USA.*
 (Continued)

*Primary Examiner* — Eric W Stamber
*Assistant Examiner* — George H Walker, III
(74) *Attorney, Agent, or Firm* — Fox Rothschild LLP (57) ABSTRACT

A method for generating a visual representation of transport schedule adherence in a transit system including collecting transport schedule data received by a plurality of sensors deployed in a plurality of transit vehicles of the transit system, organizing and saving the received transport schedule data to a data storage facility, and receiving a user selection for the generation of a visual representation of transport schedule adherence in the transit system. The method may further include, by a transportation system analysis module, extracting a portion of the transport schedule data from the data storage facility and using the extracted transport schedule data to generate and display a dynamic space time diagram of transport schedule adherence in response to the user selection, automatically generating aggregated statistics and inference based on the dynamic space time diagram, and automatically generating a suggestion for improving transport schedule adherence based on the aggregated statistics and inferences.

20 Claims, 8 Drawing Sheets

(51) Int. Cl.
*H04L 29/08* (2006.01)
*H04W 4/029* (2018.01)

(58) Field of Classification Search
USPC .................................................. 705/7.11–22
See application file for complete search history.

(56) References Cited

U.S. PATENT DOCUMENTS

| | | | | |
|---|---|---|---|---|
| 7,546,206 | B1* | 6/2009 | Miller | G01C 21/00 |
| | | | | 701/120 |
| 8,090,532 | B2 | 1/2012 | Tashev et al. | |
| 8,494,771 | B2 | 7/2013 | Delling et al. | |
| 8,909,475 | B2 | 12/2014 | Gishen | |
| 9,020,763 | B2 | 4/2015 | Faaborg et al. | |
| 9,117,223 | B1 | 8/2015 | Handel et al. | |
| 9,304,009 | B2 | 4/2016 | Beaurepaire et al. | |
| 9,404,760 | B2 | 8/2016 | Ulloa Paredes | |
| 9,435,658 | B2 | 9/2016 | Geisberger et al. | |
| 9,635,137 | B2* | 4/2017 | Brobst | G08G 1/168 |
| 10,147,058 | B1* | 12/2018 | Ouinnette | G06Q 10/06 |
| 2005/0165789 | A1* | 7/2005 | Minton | G06F 16/9577 |
| 2006/0074544 | A1* | 4/2006 | Morariu | B61L 27/0027 |
| | | | | 701/117 |
| 2007/0106434 | A1* | 5/2007 | Galbraith, II | B61L 25/08 |
| | | | | 701/19 |
| 2008/0027772 | A1* | 1/2008 | Gernega | G06Q 10/04 |
| | | | | 705/7.26 |
| 2008/0077309 | A1 | 3/2008 | Cobbold | |
| 2009/0119001 | A1 | 5/2009 | Moussaeiff et al. | |
| 2011/0112759 | A1* | 5/2011 | Bast | G01C 21/3423 |
| | | | | 701/533 |
| 2011/0225269 | A1 | 9/2011 | Yap et al. | |
| 2012/0010803 | A1* | 1/2012 | Min | G08G 1/123 |
| | | | | 701/117 |
| 2012/0095861 | A1 | 4/2012 | Feng et al. | |
| 2012/0173135 | A1 | 7/2012 | Gutman | |
| 2012/0253929 | A1 | 10/2012 | Alberth | |
| 2012/0323992 | A1* | 12/2012 | Brobst | G08G 1/168 |
| | | | | 709/203 |
| 2013/0046456 | A1 | 2/2013 | Scofield et al. | |
| 2013/0262222 | A1* | 10/2013 | Gibson | G06Q 10/025 |
| | | | | 705/14.49 |
| 2013/0265319 | A1* | 10/2013 | Fisher | G06T 13/00 |
| | | | | 345/589 |
| 2013/0275861 | A1* | 10/2013 | Goddard | G06Q 50/01 |
| | | | | 715/234 |
| 2013/0304381 | A1 | 11/2013 | Nesbitt | |
| 2013/0317742 | A1 | 11/2013 | Ulloa Paredes et al. | |
| 2013/0317747 | A1 | 11/2013 | Chidlovskii et al. | |
| 2013/0317884 | A1 | 11/2013 | Chidlovskii | |
| 2014/0032113 | A1 | 1/2014 | Nesbitt | |
| 2014/0035921 | A1* | 2/2014 | Yeh | G06T 11/206 |
| | | | | 345/440 |
| 2014/0040166 | A1* | 2/2014 | Handley | G08G 1/0112 |
| | | | | 706/11 |
| 2014/0050122 | A1 | 2/2014 | Pro et al. | |
| 2014/0089036 | A1 | 3/2014 | Chidlovskii | |
| 2014/0111358 | A1* | 4/2014 | Gontmakher | G08G 1/127 |
| | | | | 340/994 |
| 2014/0188788 | A1 | 7/2014 | Bridgen et al. | |
| 2015/0199638 | A1* | 7/2015 | Gil | G06Q 10/06395 |
| | | | | 705/7.41 |
| 2015/0204685 | A1 | 7/2015 | Gearhart et al. | |
| 2015/0287058 | A1 | 10/2015 | Dance et al. | |
| 2015/0294566 | A1* | 10/2015 | Huang | G05D 1/0261 |
| | | | | 701/41 |
| 2015/0329129 | A1* | 11/2015 | Sengupta | B61L 27/0016 |
| | | | | 701/117 |
| 2016/0231129 | A1 | 8/2016 | Erez et al. | |

FOREIGN PATENT DOCUMENTS

| | | |
|---|---|---|
| WO | 200161276 A2 | 8/2001 |
| WO | 2007061264 A1 | 5/2007 |
| WO | 2009092812 A1 | 7/2009 |

OTHER PUBLICATIONS

Mai et al., "Visualizing bus schedule adherence and passenger load through Marey graphs", proceedings of the 18th ITS World Congress, Orlando, Oct. 16, 2011-Oct. 20, 2011.

Delling et al, "Round-Based Public Transit Routing", Proceedings of the 14th Meeting on Algorithm Engineering and Experiments (ALENEX'12) Jan. 16, 2012.

* cited by examiner

FIG. 1

| transit_date_time | sched_version | block_id | route_id | block_alpha_sort | eta | seq_num | trip_id | direction_code_id | tp_name | trip_id | incident_date_time | incident_type | current_route_id | vehicle_id | driver_id | deviaten |
|---|---|---|---|---|---|---|---|---|---|---|---|---|---|---|---|---|
| 8/30/10 0.00 | 131 | 105 | 1 | 105 | 11/2/10 16:47 | 1 | 73 | 8 | PARKTERM | 444 | 8/30/10 16:47 | 6/25/05 0:00 | 1 | 1209 | 2593 | -1 |
| 11/2/10 0.00 | 141 | 503 | 5 | 503 | 1/17/11 10:36 | 5 | 634 | 7 | PAULRIDG | 454 | 11/2/10 10:35 | 6/25/05 0:00 | 5 | 534 | 3044 | 0 |
| 11/2/10 0.00 | 141 | 501 | 5 | 501 | 1/17/11 6:15 | 16 | 595 | 7 | SOTHELMW | 555 | 11/2/10 6:15 | 6/25/05 0:00 | 5 | 770 | 3027 | -1 |
| 8/30/10 0.00 | 131 | 105 | 1 | 105 | 11/2/10 10:36 | 4 | 67 | 8 | WEST M&C | 618 | NULL | NULL | NULL | NULL | NULL | NULL |
| 8/30/10 0.00 | 131 | 105 | 1 | 105 | 11/2/10 17:06 | 5 | 73 | 8 | WEST M&C | 618 | 8/30/10 17:13 | 6/24/05 0:00 | 1 | 1209 | 2593 | -8 |
| 10/18/10 0.00 | 131 | 105 | 1 | 105 | 11/2/10 10:13 | 4 | 67 | 8 | WEST M&C | 618 | NULL | NULL | NULL | NULL | NULL | NULL |
| 2/27/11 0.00 | 163 | 152 | 1 | 152 | 1/9/11 20:27 | 9 | 32 | 3 | EASTWINT | 172 | 2/27/11 20:27 | 6/25/05 0:00 | 1 | 517 | 3144 | 0 |
| 2/27/11 0.00 | 163 | 152 | 1 | 152 | 1/9/11 20:37 | 12 | 32 | 3 | NAZARETH | 408 | 2/27/11 20:36 | 7/17/05 0:00 | 1 | 517 | 3144 | 1 |
| 2/27/11 0.00 | 163 | 152 | 1 | 152 | 1/9/11 20:03 | 5 | 32 | 3 | LAKELYEL | 319 | 2/27/11 20:04 | 6/25/05 0:00 | 1 | 517 | 3144 | -1 |
| 2/27/11 0.00 | 163 | 152 | 1 | 152 | 1/9/11 20:29 | 10 | 32 | 3 | EASTPENF | 169 | 2/27/11 20:29 | 6/25/05 0:00 | 1 | 517 | 3144 | 0 |
| 8/30/10 0.00 | 131 | 103 | 1 | 103 | 11/2/10 5:42 | 1 | 41 | 3 | CHARLOTT | 83 | NULL | NULL | NULL | NULL | NULL | NULL |
| 10/18/10 0.00 | 131 | 103 | 1 | 103 | 11/2/10 5:42 | 1 | 41 | 3 | CHARLOTT | 83 | NULL | NULL | NULL | NULL | NULL | NULL |
| 10/1/11 0.00 | 131 | 103 | 1 | 103 | 11/2/10 5:42 | 1 | 41 | 3 | CHARLOTT | 83 | NULL | NULL | NULL | NULL | NULL | NULL |

FIG. 2A

| transit_date_time | sched_version | block_id | route_id | block_alpha_sort | block_alpha | eta | seq_num | trip_id | direction_code_id | tp_name | trip_id | incident_data_time | incident_type | current_route_id | vehicle_id | driver_id | deviation |
|---|---|---|---|---|---|---|---|---|---|---|---|---|---|---|---|---|---|
| 9/11/10 0:00 | 132 | 742 | 7 | 742 | 742 | 11/2/10 9:39 | 1 | 397 | 7 | IRNDPLAZA | 285 | 9/11/10 9:36 | 2003 | 7 | 504 | 3047 | 2 |
| 9/11/10 0:00 | 132 | 742 | 7 | 742 | 742 | 11/2/10 9:41 | 2 | 397 | 7 | COOPLOOP | 132 | 9/11/10 9:42 | 2003 | 7 | 504 | 3047 | -2 |
| 9/11/10 0:00 | 132 | 742 | 7 | 742 | 742 | 11/2/10 9:47 | 3 | 397 | 7 | CLINORAU | 5946 | 9/11/10 9:49 | 2003 | 7 | 504 | 3047 | -2 |
| 9/11/10 0:00 | 132 | 742 | 7 | 742 | 742 | 11/2/10 9:52 | 4 | 397 | 7 | CLNAVED | 104 | 9/11/10 9:53 | 2025 | 7 | 504 | 3047 | -2 |
| 9/11/10 0:00 | 132 | 742 | 7 | 742 | 742 | 11/2/10 10:00 | 7 | 397 | 7 | MAINPAUL | 369 | 9/11/10 10:00 | 2002 | 7 | 504 | 3047 | 0 |
| 9/11/10 0:00 | 132 | 742 | 7 | 742 | 742 | 11/2/10 10:07 | 8 | 397 | 7 | MAINPAUL | 369 | 9/11/10 10:14 | 2002 | 7 | 504 | 2618 | -7 |
| 9/11/10 0:00 | 132 | 742 | 7 | 742 | 742 | 11/2/10 10:20 | 14 | 397 | 7 | MONRHIGH | 398 | 9/11/10 10:28 | 2002 | 7 | 504 | 2618 | -9 |
| 9/11/10 0:00 | 132 | 742 | 7 | 742 | 742 | 11/2/10 10:24 | 15 | 397 | 7 | TWELCORN | 594 | 9/11/10 10:31 | 2025 | 7 | 504 | 2618 | -8 |
| 9/11/10 0:00 | 132 | 742 | 7 | 742 | 742 | 11/2/10 10:35 | 16 | 397 | 7 | PITSLOOP | 469 | 9/11/10 10:45 | 2003 | 7 | 504 | 2618 | -11 |
| 9/11/10 0:00 | 132 | 742 | 7 | 742 | 742 | 11/2/10 10:44 | 1 | 398 | 5 | PITSLOOP | 469 | 9/11/10 10:49 | 2002 | 7 | 504 | 2618 | -5 |
| 9/11/10 0:00 | 132 | 742 | 7 | 742 | 742 | 11/2/10 10:59 | 3 | 398 | 5 | TWELCORN | 594 | 9/11/10 11:04 | 2002 | 7 | 504 | 2618 | -6 |
| 9/11/10 0:00 | 132 | 742 | 7 | 742 | 742 | 11/2/10 11:03 | 4 | 398 | 5 | MONRHIGH | 398 | 9/11/10 11:06 | 2003 | 7 | 504 | 2618 | -4 |
| 9/11/10 0:00 | 132 | 742 | 7 | 742 | 742 | 11/2/10 11:17 | 9 | 398 | 5 | NRTH M&C | 414 | 9/11/10 11:16 | 2025 | 7 | 504 | 2618 | 1 |
| 9/11/10 0:00 | 132 | 742 | 7 | 742 | 742 | 11/2/10 11:20 | 10 | 398 | 5 | NRTH M&C | 414 | 9/11/10 11:21 | 2003 | 7 | 504 | 2618 | -2 |

FIG. 6

DYNAMIC SPACE-TIME DIAGRAM FOR VISUALIZATION OF TRANSPORTATION SCHEDULE ADHERENCE

BACKGROUND

In public transportation, such as bus or train modes of transport, schedule adherence is important (for both transit agencies and passengers) and refers to the level of success of the service remaining on the intended schedule. The quality of schedule adherence May depend in part on organization and visualization of copious amounts of data relating to transit vehicle performance. A MarEy graph is an example of a visualization tool currently being used for distilling the schedule of a transit system into a single image, however it is still primarily used for viewing schedules, and not performance.

However, since the original publication of the Marey graph in 1885 that plots vehicle paths as an intuitive space-time diagram, visualization has changed little in the depiction of public transit's on-time performance. Partly due to the maturing of GPS technologies, transit visualization techniques have been migrated mostly to points on a map, showing real-time movement and an abundance of other information. However, the majority of these types of visuals do not aid the user in gaining further insight or making judgments about aggregate properties of the data.

Moreover, the Marey graph has remained primarily static, leaving out exploratory properties that can be developed by allowing more interactions with the user. Thus, while transit operators can easily obtain current and historical operation information related to a vehicle or a fleet of vehicles, the information only shows an overall trend of the data, not individual data related to specific incidents that may occur during the operation of a vehicle. For example, the historical information may show how well a vehicle adhered to a set schedule over a period of time (e.g., three months), but the information does not provide an easy way to determine cause of unreliability and the relationship between reliability and passenger travel behavior.

SUMMARY

In an embodiment, a method (and system) for generating a visual representation of transport schedule adherence in a transit system may include collecting transport schedule data received by a plurality of sensors deployed in a plurality of transit vehicles of the transit system; by a processor, organizing and saving the received transport schedule data to a data storage facility; and receiving, via a user interface, a user selection for the generation of a visual representation of transport schedule adherence in the transit system. The method may further include by a transportation system analysis module, in response to the user selection, extracting at least a portion of the transport schedule data from the data storage facility and using the extracted transport schedule data to generate a dynamic space time diagram of transport schedule adherence, automatically generating aggregated statistics and inference based on the dynamic space time diagram, and automatically generating a suggestion for improving transport schedule adherence based on the aggregated statistics and inferences. The method may also include by the transportation system analysis module, causing a display device to display the dynamic space time diagram, at least a portion of the aggregated statistics and inferences, and the prediction as part of a visualization panel.

In certain embodiments, the user interface may be displayed as part of the visualization panel.

In certain other embodiments, organizing the received transport schedule data may include selecting and ordering the received transport schedule data based on at least one of the following route, schedule, direction, incident type, transit time, and time of arrival.

In various embodiments, receiving the user selection may include receiving user input for at least one of the following: a route, a schedule, a direction, and calendar entry.

In some embodiments, generating the dynamic space time diagram may include selecting, from the extracted transport schedule data, a first set of transport schedule data to be displayed to the user at all times, and selecting a second set of transport schedule data to be displayed in a pop up window based on a user action. In certain other embodiments selecting the first set of transport schedule data may include selecting at least one of the following actual travel trajectories, scheduled travel trajectories, bus stops, passenger flow, and incidents. In certain other embodiments, selecting the second set of transport schedule data may include selecting at least one of the following: name of a stop, trip ID, vehicle ID, driver ID, passenger capacity, model year vehicle series, and time delay.

In certain embodiments, displaying the dynamic space time diagram may include displaying at least one of the following: actual travel trajectories displayed as solid lines; scheduled travel trajectories displayed as dashed line; bus stops color coded to represent a different one of the following arrival status-early, late, or normal; passenger flow as thickness of the actual travel trajectories displayed as solid lines; and incidents color-coded to represent a different one of a plurality of incidents.

In various embodiments, generating the aggregate statistics and inference comprises generating at least one of the following: number of passengers affected on a route, time, or stop; top stops affected by late or early arrivals; seasonal effect on schedule adherence; driver record for schedule adherence; identification of stops operating over or under vehicle capacity; and incidents affecting schedule adherence.

In some other embodiments, generating the suggestion may include generating a recommendation to add or remove a vehicle to a transportation system based upon the at least one predicted future occurrence.

BRIEF DESCRIPTION OF THE DRAWINGS

FIG. 2B depicts a data table comprising organized data, according to an embodiment.

DETAILED DESCRIPTION

This disclosure is not limited to the particular systems, methodologies or protocols described, as these may vary.

The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

As referred to herein, a "bus" refers to any transportation vehicle (e.g., a truck, a carrier, a subway car, etc.) that travels between designated stops along a designated route.

As used in this document, the terms "time space diagram" and "space time diagram" interchangeably refer to a visual representation of data showing the position of one or more objects as a function of time. A "dynamic" space time diagram is one in which the displayed content may change as a user interactively selects content from a transportation operations database and the display is automatically updated. In the context of a transportation system, a space time diagram will illustrate the location of vehicles or passengers in the system at various points in time.

Figure 1:
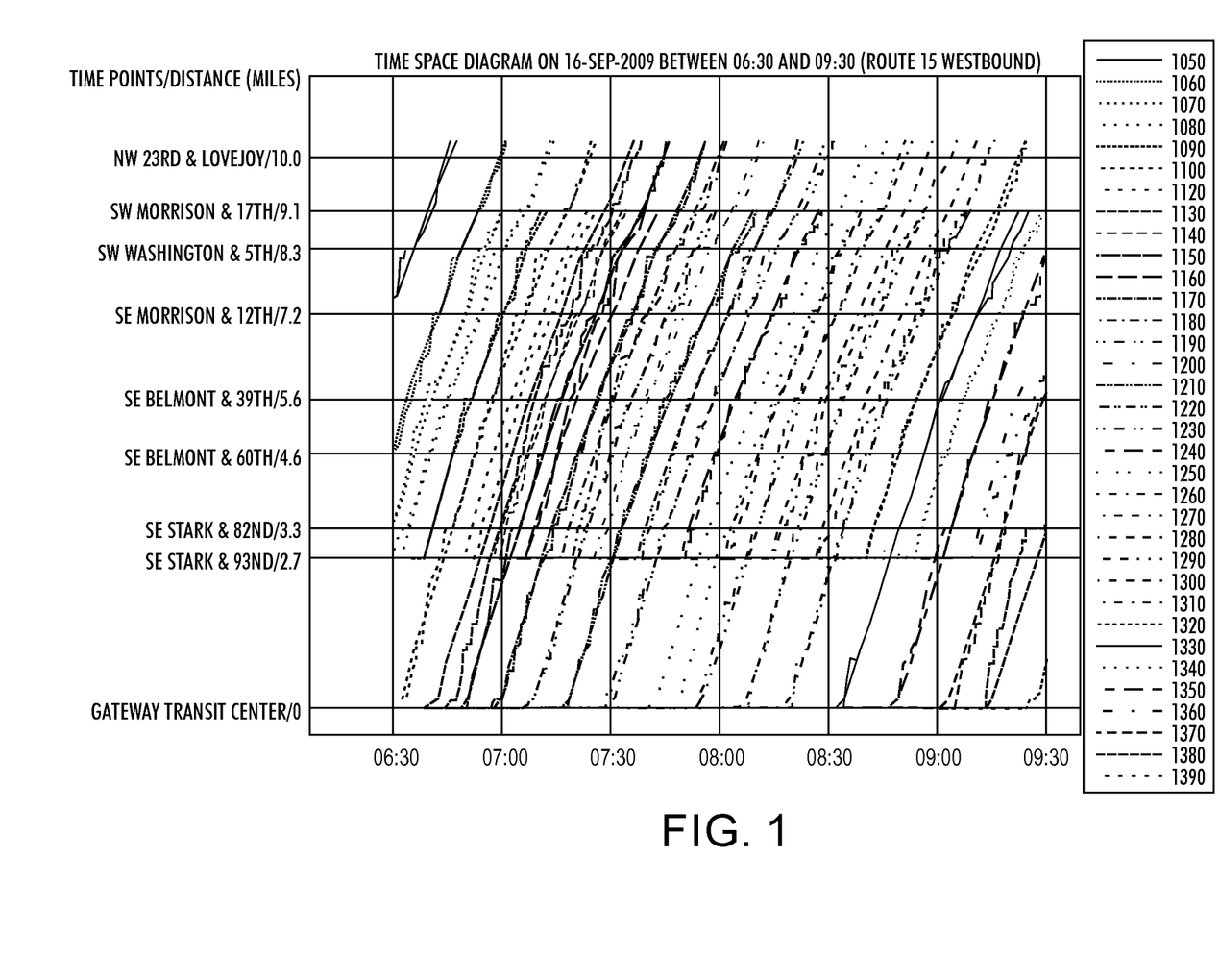
FIG. 1 depicts a prior art Marey graph.

Time-space diagrams are a very useful tool to visualize a large amount of tabular data in one figure. A "Marey Graph" is a type of time space diagram that shows vehicle schedules over time, a route, and space, a day or more, in a time-space diagram. Speeds and waiting times at stations can be determined by observing the slope of the line. Frequency of service and distance between stations can also be determined. FIG. 1 shows an example of a prior art Marcy Graph illustration.

As used herein, a "computing device" refers to a device that processes data in order to perform one or more functions. A computing device may include any processor-based device such as, for example, a server, a personal computer, a personal digital assistant, a web-enabled phone, a smart terminal, a dumb terminal, a tablet computer and/or other electronic device capable of communicating in a networked environment. A computing device may interpret and execute instructions.

The term "visualization panel" refers to a generated output to be displayed by a display device, when the output includes a space time diagram. In systems where the display is a touch screen or portal of a computing device, the visualization panel may server as a user interface via which a user may selectively view various data.

The present disclosure is directed to a method and system for visualizing and analyzing data from a transportation service provider, such as a public transportation system service provider. The system generates a visual representation of transportation system performance and schedule adherence so that a user of the system can selectively analyze the data to make informed decisions about transport system adjustment. In general, transportation companies monitor various quality of service metrics related to how a transit system is performing. Generally, these metrics reflect average performance of the transit system, variation of the performance over time, and a general distribution of performance over time. For a public transportation system, low quality of service can result in decreased ridership, higher costs and imbalanced passenger loads. As performance variability increases, waiting times also increase, thereby directly impacting customer satisfaction. From a passenger perspective, reliable service requires origination and destination points that are easily accessible, predictable arrival times at a transit stop, short running times on a transit vehicle, and low variability of running time. Poor quality of service can result in passengers potentially choosing another transportation option, thereby hurting the public transportation company potential income.

In an embodiment, a transportation system may use a computer aided dispatch/automated vehicle location (CAD/AVL) system to monitor, collect and store data from a variety of sensors deployed in a transit vehicle (on-board diagnostics systems). The data collected is usually a series of records that indicate when the bus has completed a trip between two stops. For example, CAD/AVL data may comprise global positioning system (GPS) coordinate transmissions of transportations system vehicles at various time intervals such as 30 seconds to 2 minutes depending on the system. The CAD/AVL system may further log and transmit incident information including an event identifier (ID) and a time stamp related to various events that occur during operation of the vehicle. For example, for a public bus system, logged incidents can include door opening and closing, driver logging on or off, wheel chair lift usage, bike rack usage, current bus condition, traffic status, and other similar events. Some incidents are automatically logged by the system as they are received from vehicle on-board diagnostic systems or other data collection devices, while others are entered into the system manually by the operator of the vehicle. Examples of sensors may include, without limitation, a GPS system, a passenger load sensor system (PLSS), inertial sensors, and fuel, engine temperature, tire pressure, fuel mileage, or brake condition sensors.

Hence, together with a schedule, a user can determine where a bus is relative to where it is supposed to be at a particular point in time. In a space time diagram, a user can see an entire day's activity along a route at a glance. A view that includes all sensor data may provide the user more insight in order to decide what factors to select for more precise calculations or modeling. The data may also be used to determine a historical account of incidents (random events that affect schedule adherence such as late arrivals at a transit stop, wheelchair loading/unloading, bike rack loading/unloading) that may negatively impact schedule adherence and, thus, reliability of the system. The incident data may also be used to alter the current performance of the transportation system, by providing additional vehicles to provide service, reducing the number of vehicles currently providing service, notifying vehicle drivers of schedule changes, notifying customers of schedule changes, and other related system alterations.

Alternatively and/or additionally, a transportation system may use automatic passenger count (APC) data as the data source. APC data includes counts of the number of people that get on or off the vehicle at each stop. APC data may be used to estimate passenger demand and load on the transit system. This data may help improve the efficiency of the transit system. For example, intervals on a trip that have few or no passengers might be candidates for elimination or reduction in frequencies of runs. Conversely, regions of loads exceeding sitting capacity could represent opportunities for equipment upgrades (higher capacity, articulated buses) or more frequent runs.

Referring now to FIG. 1, it illustrates a prior art static Marey Graph where the x-axis represents time, and the y-axis shows time point names and distances to a main terminal designated as the Gateway Transit Center. The solid lines represent actual travel trajectories and dashed lines represent scheduled travel trajectories, and the trips are separated by colors. Trip numbers and relative colors are shown to the right in the legend. Although this static time-space diagram can show movements of all buses along a route in one direction for a certain time of day, detailed information for each bus is not displayed because of the presence of huge amount of data that may be overwhelming to the end user.

The current disclosure proposes a basic framework to create a dynamic and data-driven environment to visualize transit schedule adherence. The system may provide as much information as possible while allowing the end user to interact with the data.

Figure 2A:
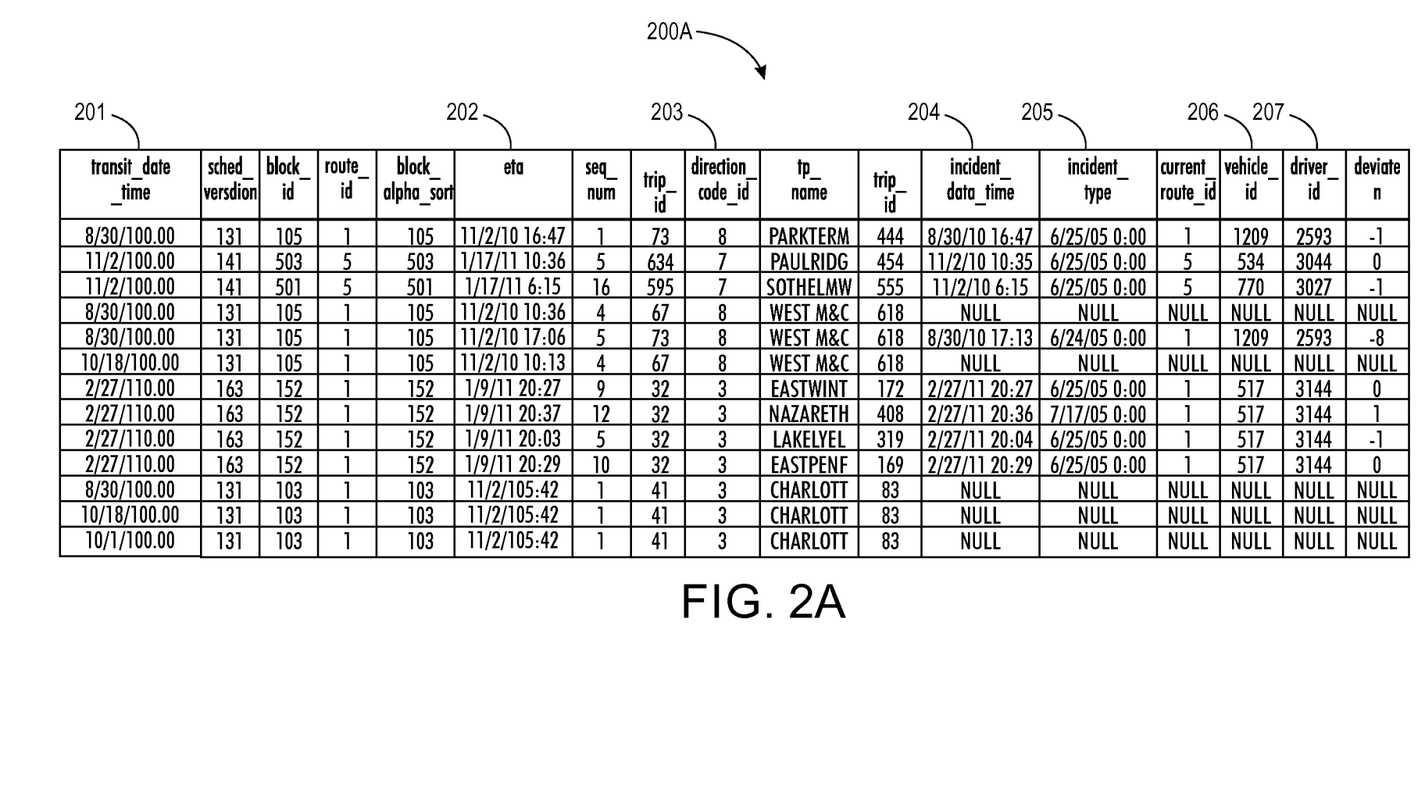
FIG. 2A depicts a first set of the raw data collected by a transport authority, represented as a data table.

FIG. 2A illustrates a first set of the raw data, represented as a table 200(a), as collected by the various sensors of a transportation system and stored in a data storage facility. The sensors may include, for example, global positioning system devices, transit stop or station vehicle detectors, optical sensors such as cameras, onboard vehicle diagnostics or data gathering systems, or the like. The dataset represents bus trips in the a metropolitan area from November of 2010 to August of 2011. The dataset contains 4,817,656 rows, or instances, and each instance includes 18 attributes (shown as columns), including transit date and time 201, estimated time of arrival 202, direction of travel 203, incident time 204, incident type 205, driver I.D. 206, and vehicle I.D. 207. In some embodiments, the information may be directly collected by and received from the CAD/AVL systems associated with the transportation vehicles and stored in a database from which the raw data table may be developed.

FIG. 2B illustrates a set of data organized and represented as table 200(b). The data may be organized using any known methods for selection and sorting. For example, in FIG. 2B the data has been filtered and sorted by grouping together data for a specific route (#9) and schedule (#132), and ordered chronologically based on the transit time and the estimated time of arrival. It will be understood to those skilled in the art that other criteria and methods for selecting, sorting and ordering for organizing the raw data may be used without deviating from the principles of the current disclosure. These filters may be incorporated into a selection panel displayed to the user (discussed with respect to FIG. 3). Other examples of filters may include, without limitation, driver I.D, Vehicle I.D., particular bus stops, and passenger count.

Figure 3:
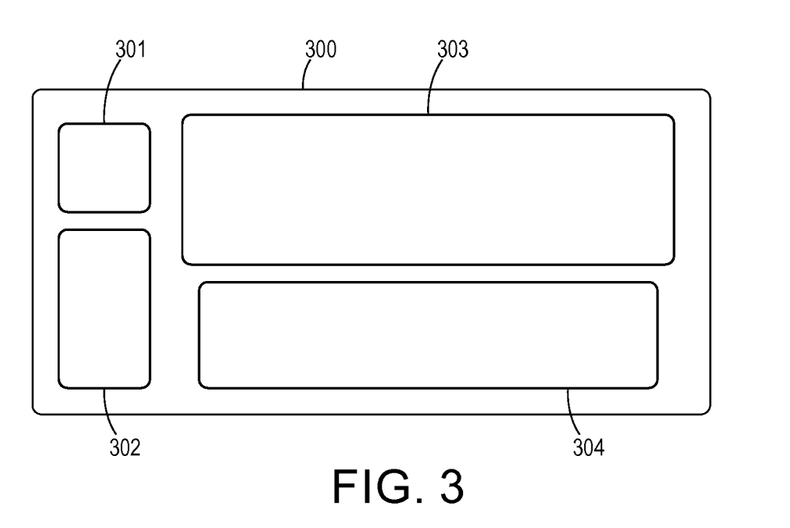
FIG. 3 depicts an overview of a visualization panel, according to an embodiment.

FIG. 3 is an example visualization panel 300 which may include, without limitation, components such a selection panel 301 that serves as user-interface by which a user may enter or select data using a mouse, keyboard, touchscreen, or other hardware input; a calendar 302; a space-time diagram 303; aggregated statistics 304; and other exploratory tools. Other examples of components may also include filters for selecting database fields and data ranges of interest; wrappers that send selected data to specific algorithms to further process the data or build models; mapping displays and tools; and a rules bank or rules management system (such as the opensourse system drools) that allow rules to be added based on the analysis the user made that session. The calendar, in an embodiment, may be presented as a scrollable user interface. In certain embodiments, the calendar may allow the user to select dates and/or times. It will be understood to those skilled in the art that the layout of the visualization panel 300 is shown by way of example only, and other layouts are within the scope of this disclosure.

Additionally and/or optionally, the visualization panel 300 may not display all the components at the same time. For example, in an embodiment, the visualization panel may only display the selection panel 301 to the user until the user has made a selection. The visualization panel may then display the calendar 302 based on the user selection, and then display the space-time diagram 303 based on a subsequent user selection from the calendar, and finally display the aggregated statistics 304 based on user selections and filters from the space-time diagram (discussed below). The order of user selections from the displayed components, and subsequent display of other components may vary. For example, the selection panel 301 may be displayed after the user has made a selection from the calendar 302, and may be based on the user selection. In some embodiments, the selection panel 301 and the calendar 302 may always be displayed to the user and the display of each component may be independent of user selection. In certain other embodiments, all the components of the visualization panel may be displayed to the user at all times, and populated and/or modified based on user selection.

In some embodiments, one or more of the components may be implemented as stand-alone applications.

Figure 4A:
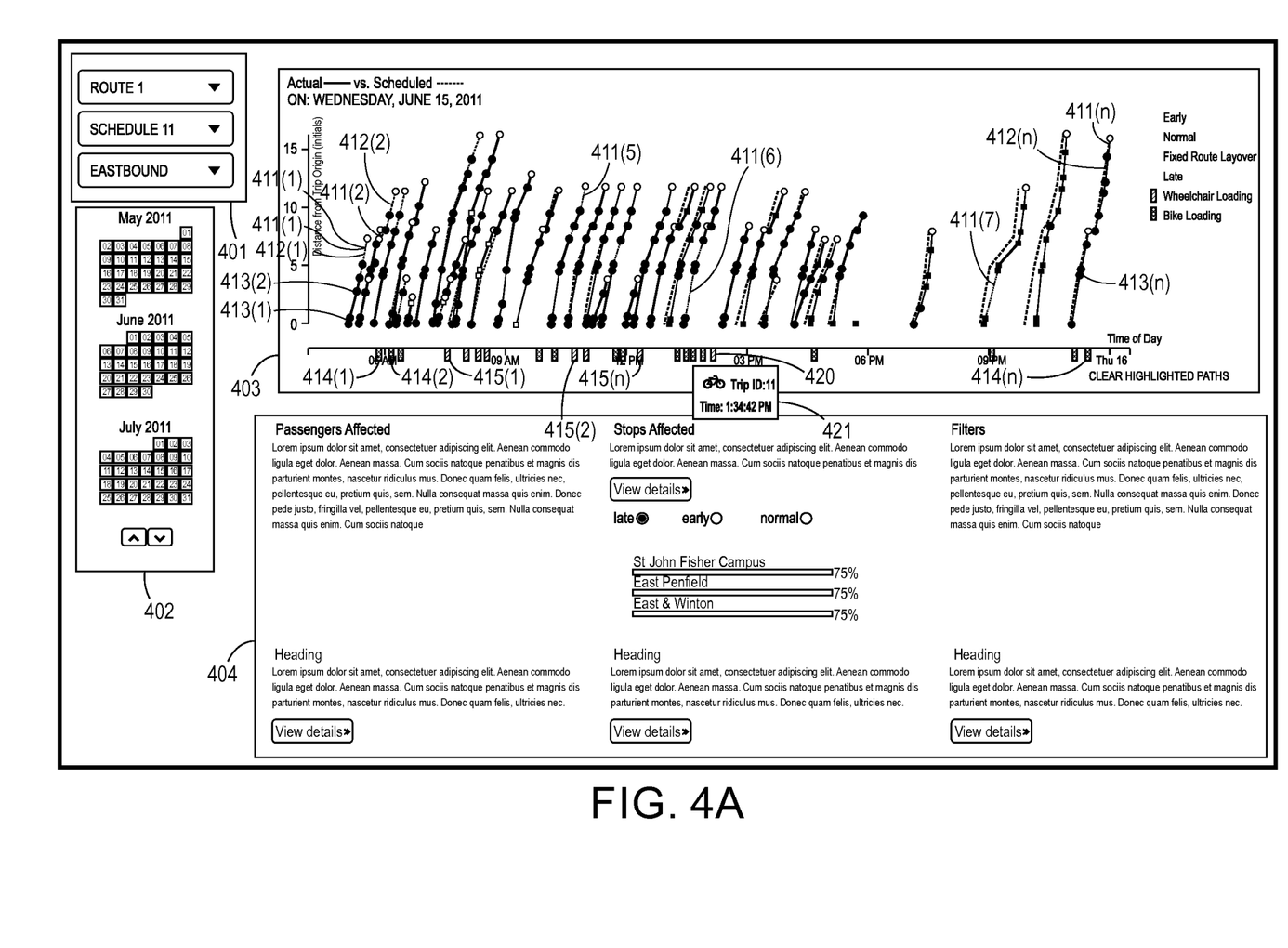
FIGS. 4A, 4B and 4C depict a detailed view of the visualization panel and various components, according to an embodiment.
Figure 4B:
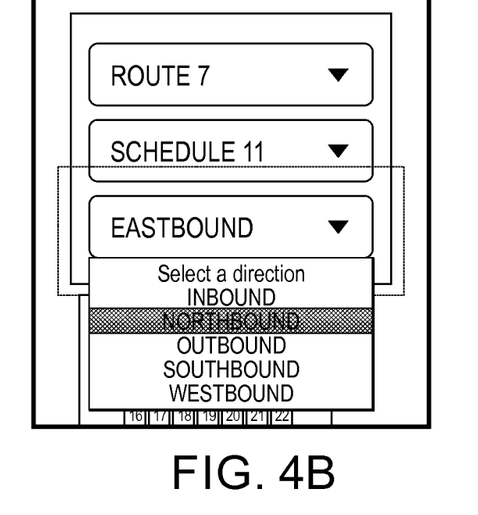

In certain embodiments, one or more components of the visualization panel 300 may include one or more sub-components. For example, as illustrated in FIG. 4A, the selection panel 401, of the visualization panel 400, may include multiple sub-selection panels that may allow the user to select criteria such as, route, schedule, and/or direction. Sub-selection panels may include other filters as discussed previously with respect to FIG. 2A. Similar to the display order discussed above, all the selection panels may or may not be displayed to the user at the same time. In some embodiments, each of the multiple sub-selection panels may be displayed as a drop-down menu to the user (as shown in FIG. 4B). In certain other embodiments, drop down menu of each subsequent sub-selection panel may be populated based on the user selection in the previous sub-selection panel.

Based upon the selections made by the user in the selection panel 401 and/or the calendar 402, a dynamic space time diagram 403 (such as a Marey graph) may be generated (discussed below) and displayed to the user, as shown in FIG. 4A. An example user selection, as shown in FIG. 4A may include route, schedule and/or direction from the selection panel 401 and dates from the calendar 402 to generate a space time diagram 403 for each date. While the current embodiments depict inspecting the performance along a route for a given day, it will be understood that the time range may vary and may include multiple days, or n a high frequency service, the user may also select a subset of a day, such as an hour, lunch time, morning rush hour. The display of very complex and/or large volume of data can be made comprehensible through mapping various attributes of the data onto these visualization dimensions.

It should be noted that the space time diagram 403 is dynamic, i.e. the user can select other time ranges or zoom in to inspect a shorter time interval in greater detail and the display is automatically updated. Specifically, if the diagram is generated for a particular date and route to show late incidents, other information (not displayed) may be obtained without performing the generation step again. This type of diagram differs from traditional visualization methods used in prior systems, which are pre-computed static images of the data.

The space time diagram 403, as shown in FIG. 4A, shows distance from trip origin (in miles) on the y-axis, and time of the day on the x-axis. The example solid lines (411(1), 411(2) ... 411(n)) represent actual travel trajectories and dashed lines (412(1), 412(2) ... 412(n)) represent scheduled travel trajectories. The circles (413(1), 413(2) ... 413(n)) represent various bus stops on the trajectory. The diagram may be generated such that the color of the circles may represent the status of the transit vehicle at a particular stop. For example in an embodiment, yellow circle may represent early arrival, green circle may represent normal time, and a blue circle may represent late arrival. Other ways of displaying information may be selected such as varying the diameter of the circle may be used to display early, normal or late arrivals. In an embodiment, various incidents may be represented on the x-axis and color coded to distinguish the incident. For example, bike-loading incidents (414(1), 414(2) ... 414(n)) and wheelchair loading incidents (415(1), 415(2) ... 415(n)) may be represented in different colors on the x-axis. It should be noted that the visual markers such as colors and/or shapes for representing stops, incidents, and the like are exemplary and any other visual markers or color (including greyscale) and/or shape may be chosen. Display of relevant other information such as an accidents, route diversions, etc., is also within the scope of this disclosure. Incidents may be displayed on the x-axis and/or the y-axis.

In some embodiment, the thickness of the displayed solid line paths (411(1), 411(2) ... 411(n)) may incorporate the logarithm of the passenger counts between the stops, such that the thickness of the solid line path between consecutive stops may vary. Thus the user may be able to discern the flow of passengers by observing the thickness of the solid line paths.

In certain other embodiments, the solid line paths may be highlighted and/or color coded to show the effect of one or more incidents on schedule adherence. For example, as shown in FIG. 4A, travel trajectories 411(5), 411(6), and 411(7) are highlighted to show the effect of bike-loading on schedule adherence.

In at least some embodiments, the dynamic space time diagram 403 may be presented in such a way that it provides direct manipulation capabilities to a viewing user. For example, a user may interact with a travel trajectory by selecting, dragging, moving, resizing, or otherwise manipulating it.

In certain embodiments, a user may be able to mouse over various data points in the space time diagram 403 to view more information about the data point. For example, as shown in FIG. 4A, the user may be allowed to mouse over a bike mounting incident 420 to receive more information 421 about the incident, such as time and trip ID.

Figure 4C:
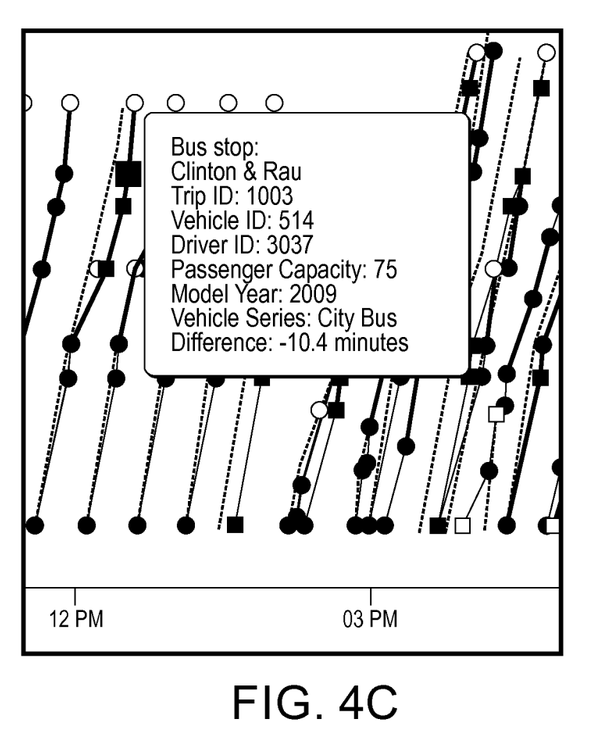

Depending on the capabilities of the CAD/AVL system, additional information related to the operation of the transportation system may be collected, analyzed and displayed. FIG. 4C shows an example embodiment showing a pop-up box with more information about a stop when the user mouses over the circle depicting the stop. The information included in the pop-up box may include, without limitation, name of the stop, trip ID, vehicle ID, driver ID, passenger capacity, model year, vehicle series, and time delay.

From the space time diagram, various inferences may be made about the data such as is there a higher chance of a late incident occurring around morning and evening rush hours, and late incidents increase around the winter months. A public transportation provider may use this information to reduce or eliminate peak occurrences by altering schedules or reassigning resources. For example, individual factors that may contribute to a late incident may be analyzed to show how their occurrence impacts overall incidence occurrence. For example, bike rack usage may contribute to the lateness of a bus. To use a bike rack, either a passenger or the operator of the bus may lower the bike rack, secure a bike within the rack, unsecure the bike when the passenger has reached their destination, and raise the bike rack one it is empty. These steps may attribute to a late incident for an individual bus and the transportation authority managing the bus may be interested in related data. For example, a user may infer from the highlighted travel trajectories (for e.g., 411(5), 411(6), and 411(7)) in FIG. 4A that bike loading incidents did not have a major impact on schedule adherence on Jun. 15, 2011. Such information may be aggregated over a period of time to draw the above example inferences.

Various known mathematical models and methods may be used to generate such inference and/or aggregated statistics, such as those disclosed in related patent publication number U.S. Pat. No. 8,832,001, which is hereby incorporated by reference in its entirety.

In certain embodiments, a user may choose the data and/or filters for generating and displaying the related inference and/or aggregated statistics. In certain other embodiments, the user may choose the type of inference and/or aggregated statistics that the system may display for the chosen data. In some embodiments, the certain aggregated statistics and/or inferences may be displayed within the visualization panel, by default.

FIG. 4A also shows an example display component 404 including one or more inferences and/or aggregated statistics. For example, the aggregate statistics may show the number of passengers affected on a particular route, time, and/or stop over a period of time (such as a day, a week or a month) and generate inferences or correlations for reasons such as peak time, incidents etc. In some embodiments, the top stops most affected by either late or early arrivals and related details. The system may also display possible reasons based on inferences. One skilled in the art will recognize that these embodiments are discussed and shown by way of example purposes only, and other aggregated statistics and inferences are within the scope of this disclosure. Some examples may include, without limitation, identification of stops always over or under vehicle capacity, seasonal effect on schedule adherence, and driver and/or vehicle record with respect to schedule adherence. The aggregated statistics and/or inference may be displayed in any known plurality of ways. Examples may include, pie charts, bar or line graphs, paragraph descriptions, percentages, radio buttons, click tabs for details, overlaid data on a map, and numerical tables.

In certain embodiments, the visualization panel may also include a component (not shown here) displaying suggestions generated by the system for improving schedule adherence and transportation system efficiency. The system may suggest that the service provider add a vehicle to a route or portion of a route to accommodate for times and/or locations when incidents are predicted to be high, such as when they typically exceed an upper threshold. Alternatively, the system may suggest that the service provider remove a vehicle from the route or portion of the route during times and/or locations when incidents are predicted to be low, such as when they typically fall below a lower threshold. Alternatively, the prediction may be presented to a user of the processing device such that the user may alter the system performance to accommodate for the late bus. Depending on the situation, altering the system performance may include adding one or more busses to the system, removing one or more busses from the system, changing a schedule for a particular bus, changing the driver of a particular bus, and other similar service alterations.

Figure 5:
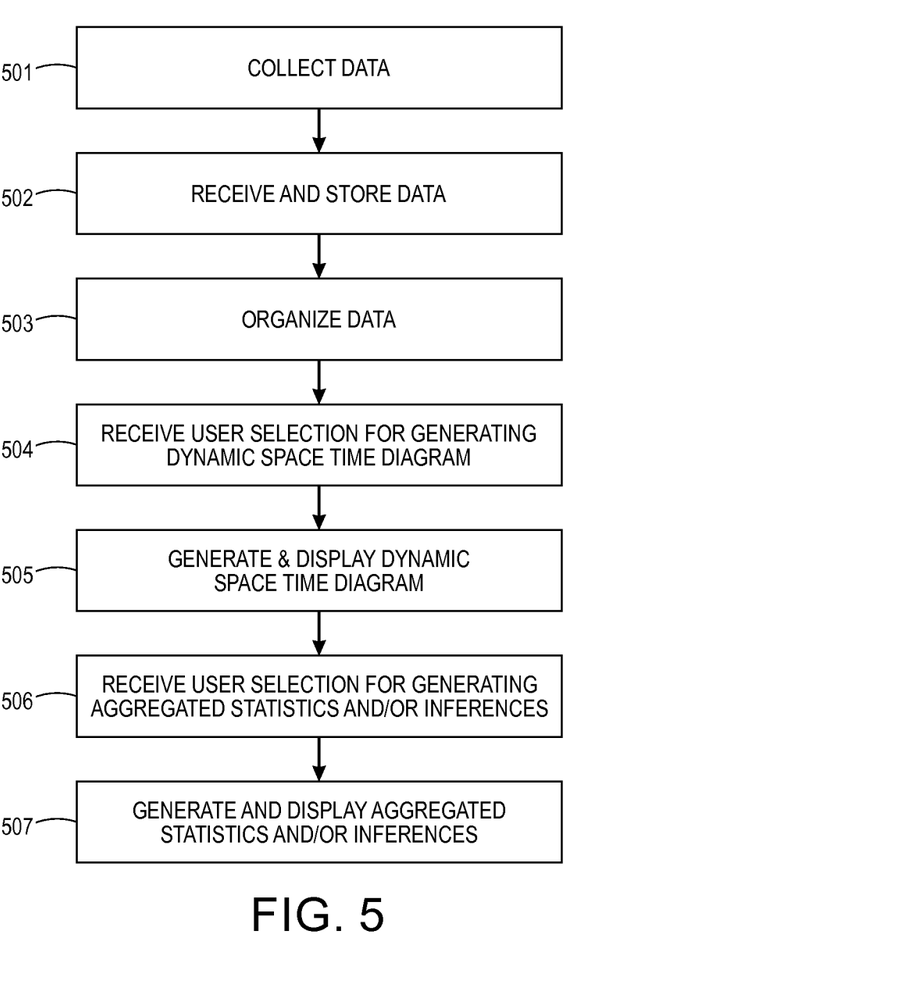
FIG. 5 illustrates a sample flow diagram of a method for collecting, organizing and displaying schedule adherence data as a dynamic space time diagram.

FIG. 5 shows illustrates a sample flow chart for collecting and displaying various data related to the operation of a transportation vehicle such as a bus. Various data such as arrival time of a bus at each stop, number of passengers, number of times a bike rack is used and number of times a wheelchair lift is used may be collected 501 via a data collection system such as the CAD/AVL and/or APC system. The data may include a date and time stamp and geographical location of the bus at each instance for later sorting and/or analysis. The data collection may include, recording a set of initial data upon starting operation of the transportation vehicle. For example, if the transportation vehicle is a bus, the operator of the bus may enter their driver identification, route number, bus number, and other related information into the data collection system.

During operation of the bus, the data collection system may include recording additional data such as an arrival time at each stop, duration of time spent at each stop, departure time from each stop, travel time between each stop, average travel speed, maximum travel speed, number of times a wheelchair ramp is used, and other related information. Additionally, the operator of the vehicle may manually enter additional information into the data collection system to be recorded. For example, each time a bike rack is accessed the driver may record this information into the data collection system.

Depending on the capabilities of the data collection system, the system may receive data from the data collection system, and store in a database or other similar storage structure, according to a set schedule. For example, depending on the network connection of the data collection system, the data collection system may upload the data each time a new entry is recorded. Alternatively and/or additionally, the information may be uploaded from the data collection system at the end of a route or the end of an operator's shift.

Once received, the server or a similar processing device may select, sort, and organize the collected raw data 503, as discussed above. In one embodiment, such organization may include grouping at least a portion of the data items into one or more groups based upon a common property or characteristic thereof.

In step 504, the system may a receive user selection from the selection panel for and the calendar on the user interface of the visualization panel. Based upon the user selection, the system may implement a transportation system analysis module. The module will include programming instructions that cause a processor of the system to retrieve and extract data corresponding to the selection from a data storage facility, and use the extracted data to generate 505 a dynamic space time diagram showing a visual representation of the selected data as discussed above.

Any suitable method may be used to generate and display the dynamic space time diagram. For example, known methods may be used to generate a Marey graph as a space time diagram as shown in FIGS. 4A-4C. For example, generation of the dynamic space time diagram may include selection of the data properties (or information) for concurrent display on the dynamic space time diagram, and selection of data for display within the pop-up windows. Such selection may be based on a number of factors including, but not limited to, format of the data, type of information, user selection, and the like. The process may further include selecting one or more ways to display the data in dynamic space time diagram, such as employing a color spectrum to show early or late arrivals, showing passenger count as logarithmic thickness of solid trip lines, or other visual techniques to enhance the visualization of the space time diagram.

In step 506, the user may select one or more filters and data for generating and displaying the default aggregated statistics and/or inference. The system may use known methods and techniques to generate and display 507 aggregated statistics and/or inference.

Finally, the transportation system analysis module may cause the system to generate one or more suggestions for improving schedule adherence or other aspects of transportation system performance, in step 508. For example, if the data shows that wheel chair lift usage has a peak in the early morning while other ridership is relatively low, the analysis module may determine that it would be advantageous to deploy para-transit vehicles in the early morning to handle wheel chair transportation demand and reduce the schedule of regular buses. To continue the above example, if the system predicts that a bus will be late to the 8:45 AM stop tomorrow morning, the module may suggest that the bus schedule be altered and communicated to the driver of that bus to accommodate for the late arrival prediction. The system may generate this suggestion based on at least an analysis of the length of delay and/or alternate routes. More specifically, a suggestion may be generated if the length of the potential delay at a stop is more than a threshold time. In some other embodiments, a suggestion may be generated if the length of the potential delay is more than a threshold time at high passenger influx stops (based on aggregated statistics), and/or during peak time. In some other embodiments, a suggestion may be generated if the system determines that an alternate route will reduce the length of the potential delay based on an analysis of the aggregated statistics. In certain embodiments, the system may generate a suggestion if it determines that the number of passengers at certain stops is exceeds the bus capacity for a predetermined number of times and/or if the difference between the number of passengers and bus capacity is more than a threshold number.

Examples of suggestions may include, without limitation, suggesting an alternate route, instructing the driver to spend less time waiting at one or more particular stops to make up for the potential late arrival, adding more buses to a particular route at certain times, and reducing the number of buses on a particular route at certain times.

The process as described above in reference to FIG. 5 is shown by way of example only. Depending upon the implementation of the process, various steps may be removed from the process. Similarly, additional steps may be added to the process to increase the overall functionality and potential productivity of the process.

Figure 6:
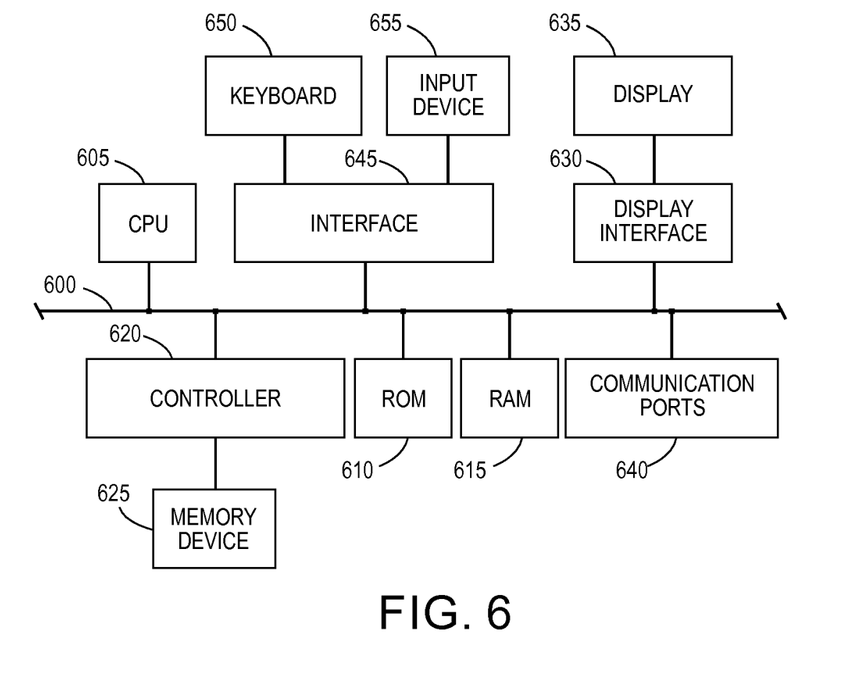
FIG. 6 depicts various embodiments of a computing device for implementing the various methods and processes described herein.

The dynamic space time diagram generation and derivations as described above may be performed and implemented by an operator of a computing device having a processor and a communications interface. FIG. 6 depicts an example of internal hardware that may be used to contain or implement the various computer processes and systems as discussed above. For example, the mobile electronic device discussed above may include hardware such as that illustrated in FIG. 6. An electrical bus 600 serves as an information highway interconnecting the other illustrated components of the hardware. CPU 605 is a central processing unit of the system, performing calculations and logic operations required to execute a program. CPU 605, alone or in conjunction with one or more of the other elements, is a processing device, computing device or processor as such terms are used within this disclosure. As used in this document and in the claims, the term "processor" may refer to a single processor or any number of processors in a set of processors. Read only memory (ROM) 610 and random access memory (RAM) 615 constitute examples of memory devices.

A controller 620 interfaces with one or more optional memory devices 625 that service as date storage facilities to the system bus 600. These memory devices 625 may include, for example, an external or internal disk drive, a hard drive, flash memory, a USB drive or another type of device that serves as a data storage facility. As indicated previously, these various drives and controllers are optional devices. Additionally, the memory devices 625 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 610 and/or the RAM 615. Optionally, the program instructions may be stored on a non-transitory, computer readable medium such as a compact disk, a digital disk, flash memory, a memory card, a USB drive, an optical disc storage medium, and/or other recording medium.

An optional display interface 640 may permit information from the bus 600 to be displayed on the display 645 in audio, visual, graphic or alphanumeric format. Communication with external devices may occur using various communication ports 650. A communication port 650 may be attached to a communications network, such as the Internet, a local area network or a cellular telephone data network.

The hardware may also include an interface 655 which allows for receipt of data from input devices such as an imaging sensor 660 of a scanner or other input device 665 such as a keyboard, a mouse, a joystick, a touchscreen, a remote control, a pointing device, a video input device and/or an audio input device.

It should be noted that a public transportation system is described above by way of example only. The processes, systems and methods as taught herein may be applied to any environment where performance based metrics and information are collected for later analysis, and provided services may be altered accordingly based upon the collected information.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method for generating a visual representation of transport schedule adherence in a transit system comprising:
    collecting transport schedule data received by a plurality of sensors deployed in a plurality of transit vehicles of the transit system, wherein the plurality of sensors comprises one or more of the following: computer aided dispatch/automated vehicle location (CAD/AVL) system, a global positioning system (GPS), a passenger load sensor system (PLSS), inertial sensors, fuel sensors, engine temperature sensors, tire pressure sensors, fuel mileage sensors, brake condition sensors, or automatic passenger count (APC) system;
    by a processor, organizing and saving the received transport schedule data to a data storage facility;
    receiving, via a user interface, a user selection for the generation of a visual representation of transport schedule adherence in the transit system;
    by a transportation system analysis module, in response to the user selection, extracting at least a portion of the transport schedule data from the data storage facility and using the extracted transport schedule data to generate a dynamic space time diagram of transport schedule adherence;
    by the transportation system analysis module, automatically generating aggregated statistics and inference based on the dynamic space time diagram;
    by the transportation system analysis module, automatically generating a suggestion for improving transport schedule adherence based on the aggregated statistics and inferences;
    by the transportation system analysis module, causing a display device to display the dynamic space time diagram, at least a portion of the aggregated statistics and inferences, and the suggestion as part of a visualization panel, wherein the visualization panel includes a user interface that allows a user to selectively view information included in the visualization panel; and
    by the transportation system analysis module, updating the dynamic space time diagram to display information not included in the dynamic space time diagram in response to a user action via the interface of the visual panel without performing the step for generating the aggregated statistics and inference again.

2. The method of claim 1, wherein the user interface is displayed as part of the visualization panel.

3. The method of claim 1, wherein organizing the received transport schedule data comprises selecting and ordering the received transport schedule data based on at least one of the following:
    route;
    schedule;
    direction;
    incident type;
    transit time; and
    time of arrival.

4. The method of claim 1, wherein receiving the user selection comprises receiving user input for at least one of the following:
    a route;
    a schedule;
    a direction; and
    calendar entry.

5. The method of claim 1, wherein generating the dynamic space time diagram comprises selecting, from the extracted transport schedule data, a first set of transport schedule data to be displayed to the user at all times, and selecting a second set of transport schedule data to be displayed in a pop up window based on the user action.

6. The method of claim 5, wherein selecting the first set of transport schedule data comprises selecting at least one of the following:
    actual travel trajectories;
    scheduled travel trajectories;
    bus stops;
    passenger flow; and
    incidents.

7. The method of claim 5, wherein selecting the second set of transport schedule data comprises selecting at least one of the following:

name of a stop;
trip ID;
vehicle ID;
driver ID;
passenger capacity;
model year;
vehicle series; and
time delay.

8. The method of claim 1, wherein displaying the dynamic space time diagram comprises displaying at least one of the following:
actual travel trajectories displayed as solid lines;
scheduled travel trajectories displayed as dashed line;
bus stops color coded to represent a different one of the following arrival status:
early,
late, or
normal;
passenger flow as thickness of the actual travel trajectories displayed as solid lines; and
incidents color-coded to represent a different one of a plurality of incidents.

9. The method of claim 1, wherein generating the aggregate statistics and inference comprises generating at least one of the following:
number of passengers affected on a route, time, or stop;
top stops affected by late or early arrivals;
seasonal effect on schedule adherence;
driver record for schedule adherence;
identification of stops operating over or under vehicle capacity; and
incidents affecting schedule adherence.

10. The method of claim 1, wherein generating the suggestion comprises generating a recommendation to add or remove a vehicle to a transportation system based upon at least one predicted future occurrence.

11. A system for generating a visual representation of transport schedule adherence in a transit system comprising:
a non-transitory, computer readable memory;
one or more processors; and
a transportation analysis module comprising computer-readable medium containing programming instructions that, when executed by the one or more processors, cause the system to:
collect transport schedule data received by a plurality of sensors deployed in a plurality of transit vehicles of the transit system, wherein the plurality of sensors comprises one or more of the following: computer aided dispatch/automated vehicle location (CAD/AVL) system, a global positioning system (GPS), a passenger load sensor system (PLSS), inertial sensors, fuel sensors, engine temperature sensors, tire pressure sensors, fuel mileage sensors, brake condition sensors, or automatic passenger count (APC) system;
organize and save the received transport schedule data to a data storage facility;
receive, via a user interface, a user selection for the generation of a visual representation of transport schedule adherence in the transit system;
in response to the user selection, extract at least a portion of the transport schedule data from the data storage facility and use the extracted transport schedule data to generate a dynamic space time diagram of transport schedule adherence;
automatically generate aggregated statistics and inference based on the dynamic space time diagram;
automatically generate a prediction for improving transport schedule adherence based on the aggregated statistics and inferences;
cause a display device to display the dynamic space time diagram, at least a portion of the aggregated statistics and inferences, and the prediction as part of a visualization panel, wherein the visualization panel includes a user interface that allows a user to selectively view information included in the visualization panel; and
update the dynamic space time diagram to display information not included in the dynamic space time diagram in response to a user action via the interface of the visual panel without performing the step for generating the aggregated statistics and inference again.

12. The system of claim 11, wherein the user interface is displayed as part of the visualization panel.

13. The system of claim 11, wherein the programming instructions for organizing the received transport schedule data comprise programming instruction that when executed by the one or more processors, cause the system to select and order the received transport schedule data based on at least one of the following:
route;
schedule;
direction;
incident type;
transit time; and
time of arrival.

14. The system of claim 11, wherein programming instructions for receiving the user selection comprise programming instruction that when executed by the one or more processors, cause the system to receive user input for at least one of the following:
a route;
a schedule;
a direction; and
calendar entry.

15. The system of claim 11, wherein the programming instructions for generating the dynamic space time diagram comprise programming instruction that when executed by the one or more processors, cause the system to select, from the extracted transport schedule data, a first set of transport schedule data to be displayed to the user at all times, and select a second set of transport schedule data to be displayed in a pop up window based on the user action.

16. The system of claim 15, wherein selecting the first set of transport schedule data comprises selecting at least one of the following:
actual travel trajectories;
scheduled travel trajectories;
bus stops;
passenger flow; and
incidents.

17. The system of claim 15, wherein selecting the second set of transport schedule data comprises selecting at least one of the following:
name of a stop;
trip ID;
vehicle ID;
driver ID;
passenger capacity;
model year;
vehicle series; and
time delay.

18. The system of claim 11, wherein the programming instructions for displaying the dynamic space time diagram comprise programming instruction that when executed by the one or more processors, cause the system to display at least one of the following:
- actual travel trajectories displayed as solid lines;
- scheduled travel trajectories displayed as dashed line;
- bus stops color coded to represent a different one of the following arrival status:
- early,
- late, or
- normal;
- passenger flow as thickness of the actual travel trajectories displayed as solid lines; and
- incidents color-coded to represent a different one of a plurality of incidents.

19. The system of claim 11, wherein the programming instructions for generating the aggregate statistics and inference comprise programming instruction that when executed by the one or more processors, cause the system to generate at least one of the following:
- number of passengers affected on a route, time, or stop;
- top stops affected by late or early arrivals;
- seasonal effect on schedule adherence;
- driver record for schedule adherence;
- identification of stops operating over or under vehicle capacity; and
- incidents affecting schedule adherence.

20. The system of claim 11, wherein the programming instructions for generating the suggestion comprise programming instruction that when executed by the one or more processors, cause the system to generate a recommendation to add or remove a vehicle to a transportation system based upon at least one predicted future occurrence.

* * * * *